United States Patent [19]

van Breen et al.

[11] Patent Number: 5,045,258

[45] Date of Patent: Sep. 3, 1991

[54] PROCESS FOR THE PREPARATION OF THERMOPLASTIC FIBERS

[75] Inventors: Adriaan W. van Breen; Josephus H. van Deursen; Franciscus I. M. Wetser, all of Amsterdam, Netherlands

[73] Assignee: Shell Oil Company, Houston, Tex.

[21] Appl. No.: 394,682

[22] Filed: Aug. 16, 1989

[30] Foreign Application Priority Data

Sep. 22, 1988 [GB] United Kingdom ............... 8822349

[51] Int. Cl.$^5$ ............................ D01D 5/12; D01F 6/26
[52] U.S. Cl. ...................................... 264/85; 264/203; 264/205; 264/210.4; 264/210.8; 264/211.15; 264/211.16
[58] Field of Search ................. 588/392; 264/211.15, 264/211.16, 210.8, 85, 203, 205, 210.4

[56] References Cited

U.S. PATENT DOCUMENTS

| | | | |
|---|---|---|---|
| 2,495,286 | 1/1950 | Brubaker | 528/392 |
| 3,798,298 | 3/1974 | Van Krimpen | 264/210 |
| 3,914,391 | 10/1975 | Nozaki | 423/364 |
| 4,411,854 | 10/1983 | Maurer et al. | 264/205 |
| 4,430,383 | 2/1984 | Smith et al. | 428/364 |
| 4,436,689 | 3/1984 | Smith et al. | 264/204 |
| 4,668,717 | 5/1987 | Lemstra et al. | 523/322 |
| 4,788,279 | 11/1988 | Drent | 528/392 |

FOREIGN PATENT DOCUMENTS

| | | |
|---|---|---|
| 121965 | 3/1984 | European Pat. Off. |
| 144997 | 12/1984 | European Pat. Off. |
| 213671 | 8/1986 | European Pat. Off. |
| 198565 | 10/1986 | European Pat. Off. |
| 8500429 | 2/1985 | Netherlands |
| 1546914 | 7/1976 | United Kingdom |

*Primary Examiner*—Hubert C. Lorin

[57] ABSTRACT

A process for the preparation of thermoplastic fibers which comprises:

(a) spinning a solution of an alternating copolymer of an olefinically unsaturated compound and carbon monoxide, having a number average molecular weight of at least 5000, to fibers through a spinning aperture, said solution having a polymer content in the range of from 0.1–50% m (b) submitting the thus obtained fibers to a solvent-removal treatment to remove substantially all the solvent, and (c) stretching the thus obtained substantially solvent-free fibers in an environment having a temperature between the glass-transition temperature of said polymer and (T+20)° C., when T is the crystalline melting point of the polymer.

4 Claims, No Drawings

PROCESS FOR THE PREPARATION OF THERMOPLASTIC FIBERS

BACKGROUND OF THE INVENTION

1. Field of the Invention

The present invention relates to a process for the preparation of thermoplastic polymer fibers.

2. Description of the Prior Art

Thermoplastic polymer fibers have drawn a lot of attention in view of their very interesting combination of potentially high strength and low weight. For this reason they are being widely used as reinforcement in many applications such as car tyres and structural applications.

It is generally accepted that for a given polymer the performance properties of the fibers prepared therefrom are amongst others related to the degree of stretching, hereinafter referred to as the draw-ratio, which can be achieved when stretching the spun fibers, which ratio may be enhanced by a high degree of polymer molecule disentanglement.

The process generally used for the preparation of thermoplastic polymer fibers, having performance properties as described hereinbefore, is solution- or gel-spinning. These processes differ from the melt-spinning process in that the polymers are dissolved in a suitable solvent or solvent blend prior to being spun, which dissolving step promotes disentanglement of the polymer molecules. A further difference from the melt-spinning process is that the solution or gel-spinning processes permit the processing of considerably higher molecular weight polymers, which is considered to be an additional advantage for the fiber production, as it is known that a high molecular weight can have a beneficial effect on the mechanical properties of products based thereon.

It has been reported by J. Smook et al, in a Poster presentation at the Rolduc Abbey Polymer Meeting, April 26–30 1987, in The Netherlands, that contrary to the excellent results obtained with gelspun ultra high molecular weight polyethylene, e.g. a maximum draw ratio=80, similar experiments with polar polymers, such as polyamides and polyesters, only resulted in draw ratios which were very similar to those obtained with the corresponding melt-spun fibers, i.e. draw ratio=6–7. These results indicate that there is still further need for improvement n the preparation of thermoplastic polymer fibers based on polar polymers, especially as fibers based on polar polymers generally demonstrate superior adhesion characteristics compared to fibers based on non-polar polymers, such as polyolefin-based fibers.

SUMMARY OF THE INVENTION

As a result of continuing and extensive research and experimentation, the Applicants surprisingly found a type of polar thermoplastic polymer which can very suitably be processed via the solution-spinning process and which results in fibers having a much higher draw-ratio than could be obtained with the fibers based on the polar thermoplastic polymers mentioned hereinbefore, i.e. draw-ratios in the range of 10 to 30.

The invention provides therefore a process for the preparation of thermoplastic polymer fibers which comprises:

(a) spinning a solution of an alternating copolymer of an olefinically unsaturated compound and carbon monoxide, having a number average molecular weight of at least 5000, to fibers through a spinning aperture, said solution having a polymer content in the range of from 0.1–50% m, (b) submitting the thus obtained fibers to a solvent-removal treatment to remove substantially all the solvent, and (c) stretching the thus obtained substantially solvent-free fibers in an environment having a temperature between the glass-transition temperature of said polymer and $(T+20)°$ C., wherein T is the crystalline melting point of the polymer.

In the context of the present invention the term solution refers to polymer solutions wherein interaction between polymer molecules may occur, which phenomenon may further be concentration related. The term "% m" refers to percentage mass.

The term "fiber" wherever used in this specification includes mono- and multifilament fibers. The term "alternating" copolymer refers to those copolymers in which the CO-units in the macromolecules are in alternating arrangement in respect of the units derived from the olefin. Thus, in the macromolecular chains, each CO-unit is positioned next to a single unit of olefin, e.g. ethylene. The copolymer can be a true copolymer of carbon monoxide and one particular olefin, preferably ethylene or they can be copolymers of carbon monoxide and more than one olefin, e.g. ethylene and propylene. In the latter case ethylene is preferably employed as the major olefin. The relevant alternating copolymers are known per se, for example from EP-A 121965, EP-A 213671, EP-A 229408 and US-A 3914391, likewise, their methods of preparation by catalytic copolymerization are known from these references. Suitable polymerization catalysts are based upon palladium/phosphine systems.

Particularly suitable thermoplastic polymers to be employed in the process of this invention are copolymers of ethylene and carbon monoxide, terpolymers of ethylene, propylene and carbon monoxide, preferably those in which the ethylene to propylene molar ratio in the polymer chains is at least 3:1. Other suitable terpolymers are terpolymers of ethylene and carbon monoxide with butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone and the diethylester of vinyl-phosphonic acid, provided the molar ratio of ethylene to other unsaturated monomer in the polymer macromolecules is at least 3:1, preferably at least 8:1.

Such preferred alternating copolymers have a number average molecular weight of at least $10^4$. An especially preferred class of the hereinbefore described alternating copolymers are those based on carbon monoxide and ethylene having a number average molecular weight of more than $10^6$. The preparation of these high molecular weight polymers has been described in Neth. Patent Application no. 8800600.

Use of other known ethylene/CO copolymers which do not display an alternating structure and which are produced using free radical catalysts, is not contemplated in this invention.

With solution- or gel-spinning the fibers emerging from the spinning aperture will generally have insufficient strength to allow easy handling, in view of their high solvent content. Sometimes the handleability of the solvent-containing fibers can be improved by cooling. This method may be applied e.g. when the spinning is conducted at elevated temperature. Subsequent cooling of the fiber will cause the polymer solution to gelate, provided an appropriate solvent system had been used in the preparation of the polymer solution, thereby improving the handleability of the fibers. Such gelled fibers will at some stage require a solvent removal treatment, prior to being stretched, in order to convert the fibers into their ultimate form. Frequently the handleability improvement is achieved via a solvent removal treatment. In one such method the solvent removal is achieved by leading the solvent-containing fibers through a shaft through which e.g. hot air can be blown, as a result of which all or part of the solvent may be evaporated.

In another preferred method of the present invention for solvent removal, the solvent-containing fibers are passed through a bath containing a liquid which has the ability to extract the solvent component from the solvent-containing fibers, without simultaneously dissolving the polymer.

Although in principle any compound may be used for the solvent component of the polymer solution, provided the combination of said compound and the polymer as hereinbefore described results in a polymer solution which can be processed via solution- or gel-spinning, it will be understood by those skilled in the art that when selecting the solvent component for the polymer solution, the conditions where under the spinning process is to be conducted, will also be taken into account.

In addition to the use of polymer solution based on a single solvent, it is also possible to employ solvent blends, wherein for example the boiling point and/or the dissolution power of the individual solvents may be the same or different.

Solvents which may advantageously be employed in the preparation of polymer solution for use in the process of the present invention include hexafluoroisopropanol (hereinafter HFIPA), m-cresol and mixtures thereof. A number of solvents which as such may be considered to be non-solvents for the alternating copolymers as described hereinbefore, may occasionally be beneficially employed, in a minor amount, in combination with the solvents mentioned hereinbefore. Such compounds include aromatic hydrocarbons such as toluene; lower aliphatic alcohols such as methanol, ethanol and isopropanol; aliphatic hydrocarbons such as n-hexane and isooctane; ketones such as acetone and methyl ethyl ketone; and acids such as formic acid and acetic acid. Ethanol is a preferred non-solvent.

Depending on the nature of the polymer composition employed for the fiber preparation, most of the non-solvents listed hereinbefore, may conveniently be employed as extracting agent(s) for the solvent removal treatment of the fibers via the extracting procedure. Acetone is a preferred extracting agent for use in the solvent removal treatment.

The polymer content of the solutions will preferably be in the range of from 0.25–20% m, and more preferably in the range of from 0.5–10% m.

Although in principle the substantially solvent-free fibers prepared according to the process of the present invention may already be stretched in an environment having temperature just above the glass transition temperature of the polymer, it is very difficult to visualize stretching under these conditions as part of an economically viable process. Hence, in practice, stretching will be conducted at considerably higher temperatures. Preferably the temperature of the environment will be in the range of from $(T-100)°$ C. to $(T+10)°$ C. and more preferably in the range of from $(T-50)°$ C.-$T°$ C. The environment wherein the fibers are to be stretched may be a liquid environment, such as an organic or inorganic oil or oily substance, or a gaseous environment such as oxygen, nitrogen, air, carbon dioxide or one of the inert gases. Preferably the environment is inert with respect to the polymer fiber. Nitrogen is a preferred inert gaseous environment for conducting the stretching operation.

Stretching may be effected in a single step or in more than one step. With the latter mode of operation the temperature of a preceding step will generally be lower than that of the consecutive step.

When required the fibers based on the alternating copolymers as described hereinbefore may contain appropriate amounts of one or more auxiliary compounds such as antioxidants, stabilisers, processing aids, dyes and the like. Should the presence of one or more of said auxiliary compounds be required, it or they may advantageously be introduced during or after the preparation of the polymer solution.

The invention is further illustrated with the following examples for which the following information is provided.

DETAILED DESCRIPTION OF THE INVENTION

Solution preparation: The polymer solutions having a viscosity in the range from $10^4$–$10^5$ m.Pa.s were prepared by dissolving the appropriate amount of polymer in the desired solvent, in a jar or bottle, on a roller table at approximately 20° C.

Fibre spinning: The various polymer solutions were spun with the aid of a Perfusor motorized syringe injector (ex B. Braun Melsungen A.G., W. Germany) in combination with a 20 ml syringe, which was connected to a 300 mm teflon capillary having an internal diameter 1.75 mm. The free end of the capillary, having a diameter of 1.3 or 1.75 mm and which acted as the spinning aperture, was positioned above the extraction bath with the opening parallel to the surface of the bath. The speed at which the polymer solution was ejected from the capillary into the extraction bath, hereinafter referred to as linear spinning speed, could be varied by altering the setting of the ejector. The distance over which the fiber travelled through the extraction bath, containing acetone as extracting solvent, was approximately 1.20 m, while the distance between bath and reel on which the substantially solvent-free fiber was collected, was 1.50 m.

Fiber stretching: The fibers were stretched in a stretching chamber or oven, having a length of 20 cm and containing nitrogen having a temperature as indicated hereinafter. Stretching was conducted in a single or a two-step stretching procedure. With the latter two-step stretching procedure, stretching was conducted in two identical ovens with intermediate cooling of the fiber. The degree of stretching was regulated by adjusting the roller speed. The reel-up speed was fixed at 2 m/min for a single-step stretching procedure, while with a two-step stretching process the fiber was introduced into the oven at a speed of 0.16 m/min.

Fibre testing: The potential performance properties of the fibers were assessed by measuring the modulus and tensile strength of the fibers with the aid of a table model Instron 1122 Tensile tester, equipped with a load cell having a max. capacity of 2000 g. The modulus was determined employing a cross head speed of 1 mm/min, while for the strength a cross head speed of 5 mm/min was used. Prior to testing, the samples were conditioned at 23° C. and 50% rel. humidity for at least 24 h.

Polymers tested: The following polymers were used for fiber preparation.

A. Ethylene/CO copolymer melting temp.($T_M$) approx 260° C., $\overline{M}_n = > 10^6$

TABLE 1

| Example | Solvent (blends in % V) | Polymer Type | conc % m | Aperture diameter mm | Linear spinning speed m/h | Stretching Oven temp °C. 1st oven | Stretching Oven temp °C. 2nd oven | Draw ratio | Diam. μm | Fibre Properties Modulus GPa | Fibre Properties Tensile strength GPa |
|---|---|---|---|---|---|---|---|---|---|---|---|
| I | HFIPA* | A | 1 | 1.75 | 10 | 250 | — | 14 | 40 | 9.0 | 0.6 |
|   |   |   |   |   |   | 255 | — | 16 | 33 | 12.2 | 0.9 |
|   |   |   |   |   |   | 260 | — | 19 | 31 | 14.9 | 0.9 |
| II | HFIPA 75* m-cresol 25 | A | 1 | 1.75 | 10 | 250 | — | 24 | 30 | 22.6 | 1.0 |
|   |   |   |   |   |   | 255 | — | 20 | 30 | 20.2 | 1.3 |
|   |   |   |   |   |   | 265 | — | 26 | 30 | 16.9 | 1.0 |
| III | HFIPA 50* m-cresol 50 | A | 1 | 1.75 | 10 | 250 | — | 13 | 32 | 10.6 | 1.0 |
|   |   |   |   |   |   | 255 | — | 17 | 30 | 12.4 | 0.9 |
|   |   |   |   |   |   | 260 | — | 19 | 26 | 20.8 | 1.0 |
|   |   |   |   |   |   | 265 | — | 26 | 23 | 20.6 | 1.1 |
| IV | HFIPA 50* m-cresol 50 | C | 8 | 1.75 | 10 | 215 | — | 15 | 62 | 9.9 | 0.7 |
| V | HFIPA 75* m-cresol 25 | B | 3.5 | 1.30 | 16 | 250 | — | 18 | 40 | 6.8 | 1.0 |
|   |   |   |   |   |   | 250 | 255 | 10/1.9*** | 35 | 14.1 | 1.3 |
|   |   |   |   |   |   | 250 | 260 | 10/2.1 | 34 | 15.2 | 1.4 |
|   |   |   |   |   |   | 250 | 265 | 10/2.1 | 32 | 13.7 | 1.2 |
| VI | HFIPA 80* ethanol 20 | B | 3.5 | 1.30 | 16 | 245 | 255 | 10/1.9 | 30 | 18.2 | 1.4 |
|   |   |   |   |   |   | 245 | 265 | 10/2.5 | 27 | 25.1 | 1.5 |
| VII | HFIPA 62.6* m-cresol 20.9 ethanol 16.5 | B | 3.5 | 1.30 | 16 | 245 | 255 | 10/2.1 | 23 | 25.0 | 1.7 |
|   |   |   |   |   |   |   | 265 | 10/2.5 | 24 | 26.9 | 1.6 |

*Solution contains 0.5% m polymer of Ionol CP and of Irganox 1076
**Solution contains 0.05% m on solution of Ionol CP and of Irganox 1076
***Drawdown ratio in first oven:10; drawdown ratio in 2nd oven is value after stroke (/)

Ethylene/CO copolymer $T_M$ approx 260° C., $\overline{M}_n = 1.3 \times 10^5$

C. Ethylene/propylene/CO terpolymer $T_M$ approx 218° C., $\overline{M}_n = 4.6 \times 10^4$

EXAMPLES I-VII

Polymer solutions of the composition as indicated in Table 1 hereinafter, were spun at approximately 20° C., and subsequently passed through the extraction bath. The stretching of the substantially solvent-free fibers was conducted under the conditions as indicated in Table 1 which table also includes the results of the fiber testing.

Examples I-III demonstrate the influence of the solvent composition on the fiber spinning and fiber properties.

Examples III and IV demonstrate the influence of the polymer composition albeit that polymer C also has a lower $\overline{M}_n$ than polymer A.

Examples II and V demonstrate the possible influence of molecular weight.

Example V also demonstrates the positive effect of a two-step stretching procedure over a single-step stretching procedure.

Examples V, VI and VII demonstrate the influence of a solvent blend containing a non-solvent.

In nearly all the examples the effect of the temperature at which the fibers have been stretched is shown.

Many other variations and modifications may be made in the techniques hereinbefore described, by those having experience in this technology, without departing from the concept of the present invention. Accordingly, it should be clearly understood that the methods referred to in the foregoing description are illustrative only and are not intended as limitations on the scope of the invention.

We claim as our invention:

1. The process for the preparation of thermoplastic polymer fibers which comprises:
   (a) preparing a polymer solution having a viscosity in the range from $10^4$ to $10^5$ m.Pa.s by dissolving from 0.25 to 50% m of an alternating copolymer of an olefinically unsaturated compound and carbon monoxide having a number average molecular weight of at least 5,000 in a solvent,
   (b) forming fibers by flowing said polymer solution through an aperture,
   (c) removing substantially all of the solvent by submerging said fibers in a solvent extracting agent,
   (d) removing said fibers from submersion in said solvent extracting agent, and
   (e) stretching the thus obtained substantially solvent-free fibers in a gaseous inert environment having a temperature between the glass-transition temperature of said polymer and (T+20)° C., wherein T is the crystalline melting point of the polymer.

2. The process of claim 1, wherein the solvent present in the polymer solution is selected from the group consisting of hexafluoroisopropanol, m-cresol, or a mixture thereof.

3. The process of claim 1, wherein acetone is selected as the solvent extracting agent.

4. The process of claim 1, wherein nitrogen is selected as the gaseous environment.

* * * * *